United States Patent
Rilly

[19]

[11] Patent Number: 6,085,017
[45] Date of Patent: Jul. 4, 2000

[54] CURRENT SUPPLY CIRCUIT FOR A CONSUMER ELECTRONICS APPARATUS

[75] Inventor: Gerard Rilly, Unterkirnach, Germany

[73] Assignee: Deutsche Thomson-Brandt GmbH, Villingen-Schwenningen, Germany

[21] Appl. No.: 08/771,360

[22] Filed: Dec. 16, 1996

Related U.S. Application Data

[63] Continuation of application No. 08/181,127, Jan. 13, 1994, abandoned.

[30] Foreign Application Priority Data

| Jan. 30, 1993 | [DE] | Germany | 43 02 636 |
| Oct. 16, 1993 | [DE] | Germany | 43 35 374 |

[51] Int. Cl.$^7$ .................................................. H04N 5/76
[52] U.S. Cl. ................................................ 386/46; 348/730
[58] Field of Search ........................ 386/46, 125, 49, 386/48, 107, 117; 358/906, 909.7; 348/705, 730, 734; 307/43, 46, 64, 66, 80, 85, 86; 713/324; 700/82; H04N 5/76

[56] References Cited

U.S. PATENT DOCUMENTS

| 4,630,133 | 12/1986 | Long | 358/335 |
| 4,768,110 | 8/1988 | Dunlap et al. | 360/33.1 |
| 4,789,905 | 12/1988 | Ezaki | 358/355 |
| 4,975,592 | 12/1990 | Hahn et al. | 348/730 |
| 5,025,324 | 6/1991 | Hashimoto | 358/335 |
| 5,029,007 | 7/1991 | Spiero | 358/181 |
| 5,109,284 | 4/1992 | Jung | 358/335 |
| 5,142,379 | 8/1992 | Jung et al. | 348/730 |
| 5,175,441 | 12/1992 | den Hollander | 348/730 |
| 5,189,600 | 2/1993 | Keck et al. | 348/730 |
| 5,231,511 | 7/1993 | Kodama et al. | 358/335 |
| 5,262,885 | 11/1993 | Steers et al. | 359/152 |
| 5,270,823 | 12/1993 | Heidebroek et al. | 348/730 |
| 5,313,282 | 5/1994 | Hayashi | 348/730 |

FOREIGN PATENT DOCUMENTS

| 0158251 | 10/1985 | European Pat. Off. | H04N 5/63 |
| 0167737 | 1/1986 | European Pat. Off. | H04N 5/63 |
| 3045715 | 6/1982 | Germany | H04Q 9/14 |
| 53-173367 | 10/1983 | Japan | H04N 5/63 |

*Primary Examiner*—Huy Nguyen
*Attorney, Agent, or Firm*—Joseph S. Tripoli; Peter M. Emanuel; David T. Shoneman

[57] ABSTRACT

A current supply circuit for an electronic apparatus having standby, normal and economy modes of operation includes a remote control receiver which responds to a remote control signal from a remote control unit to select either mode of operation. A voltage source provides a main voltage which is detected to produce a switching voltage when the main voltage is present. The switching element of a voltage responsive switch is connected to a first input contact in the presence of the switching voltage and to a second input contact in the absence of the switching voltage. The output contact of the voltage responsive switch is connected to an input terminal of the remote control receiver and to a first input terminal of the filter. The output contact is selectively connected to the first and second input contacts in response to the respective presence and absence of the switching voltage to apply a first operating voltage to the first input contact in the presence of the switching voltage and a second operating voltage to the second input contact to place the current supply circuit into the economy mode of operation in the absence of the switching voltage.

3 Claims, 3 Drawing Sheets

CURRENT SUPPLY CIRCUIT FOR A CONSUMER ELECTRONICS APPARATUS

This is a continuation of application Ser. No. 08/181,127, filed Jan. 13, 1994, abandoned.

FIELD OF THE INVENTION

The invention is based on a current supply circuit for a consumer electronics apparatus.

BACKGROUND OF THE INVENTION

In apparatus of this type, the standby mode is generally switched on for long periods of time not least because many users do not switch from the standby mode into the fully switched-off mode even when the apparatus is not being used for long periods, during a long absence and during the night-time. One therefore endeavours to keep the power consumption of the apparatus from a source of main power (i.e., "the mains") as low as possible during the standby mode.

SUMMARY OF THE INVENTION

The object of the invention is to construct the apparatus such that the power taken from the mains during the standby mode is reduced still further. This object is achieved by the invention defined in claim 1. Advantageous developments of the invention are specified in the appendant claims.

The invention consists in that, a third mode is provided as an economy mode in which only the remote control receiver and a filter connected to its output are supplied with operating voltage and that the filter is constructed such that it recognises whether a remote control signal having a code allocated to the apparatus is being received and, in this case, generates a first switching voltage which activates the generally switched-off micro processor.

Thus, with the invention, there is created a third mode, which may be referred to as an economy mode. During this mode, only the infra-red remote control receiver and a selective filter connected thereto are effective. The filter only has the task of checking, in the economy mode, as to whether a code really allocated to the apparatus is being received, without itself evaluating the command conveyed by the code. Accordingly, the filter distinguishes between a code of this type and similar signals such as may be coming from other loading devices such as fluorescent tubes. These two components can be realised with a very low power consumption, the receiver with 9 mW for example and the filter with just a few mW whereby, the filter may even be constructed to be purely passive. It is only when a code allocated to the apparatus is recognised in the filter that the micro processor controlling the entire apparatus, which is switched off in the economy mode, is activated i.e. "woken from its sleep" so to speak. The micro processor then evaluates the code supplied to it by the remote control receiver. As soon as the micro processor recognises a realisable command e.g. "switch the receiver to channel 11", the processor automatically switches on the operating voltage and thereafter maintains itself active.

Preferably, the edge slope, the pulse duration and the pulse spacing of the signal received by the remote control receiver are evaluated in the filter. Thereby, a sufficient distinction of a correct code from similar codes from other loading devices is possible. The filter preferably comprises a differentiating stage for detecting the edge slope, a first threshold value stage, an integrating member for detecting the pulse spacing, a second threshold value stage and a monostable trigger stage whose output voltage serves for the activation or "awakening" of the micro processor.

In accordance with a further development of the invention, the apparatus is completely disconnected from the mains during the third mode i.e. the economy mode, and the remote control receiver and the filter are only supplied with operating voltage by a battery contained in the apparatus. Despite the availablity of the mains, the reasoning for this type of battery supply is the following. The main power supply for the television receiver or the video recorder which is generally constructed for powers of between 100 and 200 Watt, has a poor efficiency, and thus a large dissipation, in the case of the low consumption of just a few mW during the economy mode. It has been shown that for the extremely low consumption of e.g. 10–20 mW in the economy mode, the current supply by a battery is more economical from an energy viewpoint than the permanent operation of the main power supply or of an auxiliary power supply. The power loss can be considerably reduced by the use of the battery. Since, from experience, the apparatus is regularly switched into the normal mode, it is also ensured that the battery is recharged sufficiently often and for long enough by a voltage which is available in the apparatus during the normal mode. As regards the dangers of short circuiting, fire and the like, the powering with a battery is also safer than a continuous powering in which the main power supply is permanently connected to the mains.

In accordance with one embodiment of the invention, a detector circuit is connected to the mains which detects the presence or absence of the mains and generates a switching voltage that switches off the battery from all the components in the apparatus in the absence of the mains. The reason for this is the following. If the mains is not available e.g. a power cut or during transportation of the apparatus, the normal mode is not possible. An economy or standby mode, which is intended to make it possible to switch into the normal mode at any time, is then useless and would consume energy superfluously.

Preferably, a detector circuit is also connected to the battery which, for an excessively discharged battery, generates a third switching voltage that switches the apparatus from the economy mode into the standby mode from the mains. Thereby, it is achieved, that even with an excessively discharged battery, the apparatus remains controllable by the remote control unit. The user does not then notice the switch over. It is merely switched from economy mode by battery into the standby mode from the mains. A fault warning may be used to indicate the operational state although the warning does not have to appear continuously. It suffices, if this warning can be called upon demand.

In a further development of the invention, the principle is used for video recorders. Only the functions which are needed for a problem-free display of the television picture remain switched on whereby a return to the normal mode is ensured. Due to this form of operation, the power consumption is reduced to approximately 2 Watts whereby there results a power saving of 80%. For 1,000,000 apparatus, this would result in a saving of 16,000,000 DM per year.

In a known video recorder, the following functions are switched on in the standby mode:

The so-called power splitter, it passes the antenna signal supplied to the video recorder on to the television set.

The clock, be cause of the monitoring of the time for possibly set recordings.

The display, it serves for the communication of information for the user.

The keyboard, it is required in order for the user to switch on the apparatus.

The cassette feeder, so that the apparatus is switched on automatically upon insertion of a cassette.

The infra-red receiver, it is needed in order to be able to accept information from the remote control.

The Scart scrambler and the keyboard processor are active for internal tasks.

With the said further embodiment of the invention, of these, only the functions which are needed for a problem-free television picture remain switched on whereby a return to the normal mode is ensured. This is achieved in that the power splitter and the clock remain active in order to make possible a television picture on the one hand and to ensure a monitoring of the time on the other hand. Furthermore, a so-called economy logic is activated from time to time so as to make it possible to continue to make time controlled recordings. The power consumption of the power splitter, the clock and the economy logic amounts to about 2 Watts in contrast with the previously mentioned 10 Watts which are consumed in the normal standby mode.

The activation of the economy mode is enabled by the economy button. In the active economy mode, functions such as display, cassette feed, keyboard and infra-red receiver are not active. These tiny limitations as to use, are more than compensated by the financial and environmental aspects. The economy mode could, additionally, also be activated over the remote control.

The economy logic controls when the VCR has to be switched from the normal economy mode into the limited economy mode. This is the case for timer recordings. For recordings dependent on time, the logic activates the processor which is necessary for the recording activities once a day e.g. at 00.00 hours and checks whether a timer recording has to be made on the following day.

If a VPS programming for that day is present, there is a switch into the limited economy mode in that those groups of functions which are needed for a recording are connected up. The display, the infra-red receiver, the keyboard and the cassette feeder remain inactive. Once the recording has ended, the processor checks as to whether there is to be a further timer recording on this day. If not, the apparatus transfers into the normal economy mode. If there is to be a non-VPS programming on this day, the video recorder is switch ed over into the limited economy mode at the given recording time and the recording is made. After the last recording for this day, the apparatus passes into the normal economy mode.

Thus, in contrast to the present state of the art, this embodiment is particularly advantageous for creating a way for video recorders to sensibly reduce the consumption of energy.

BRIEF DESCRIPTION OF THE DRAWING

The invention will be explained hereinafter with the help of the drawing.

DETAILED DESCRIPTION OF THE DRAWING

Figure 1:
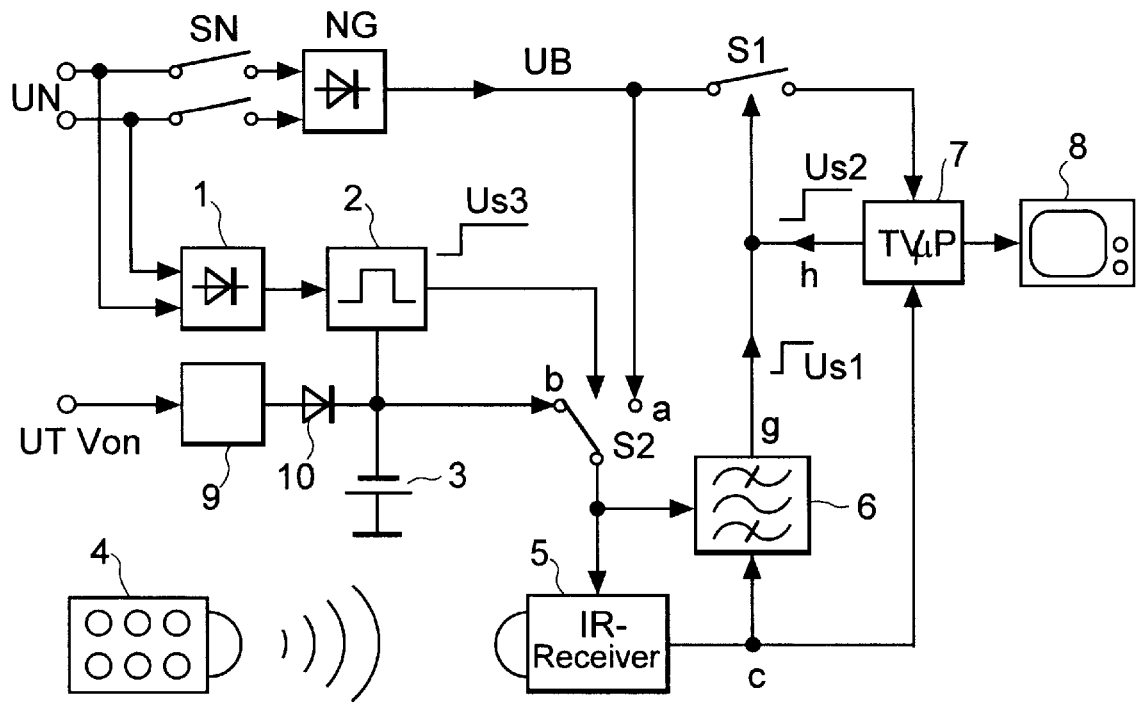
FIG. 1 shows a block circuit diagram of a television receiver including the current supply circuit in accordance with the invention, FIG. 2 a practical construction of the filter, FIG. 3 curves for explaining the manner of operation of the circuit in accordance with FIG. 2, FIG. 4 timer operation in the economy mode and FIG. 5 a circuit in accordance with the invention for the method in accordance with FIG. 4.
Figure 2:
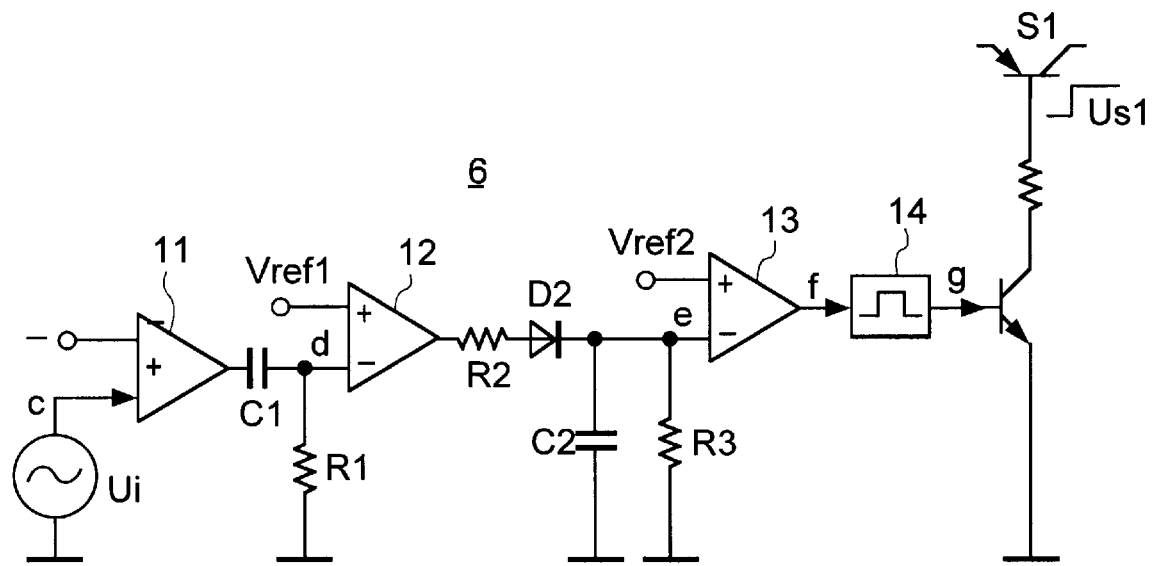
Figure 3A:
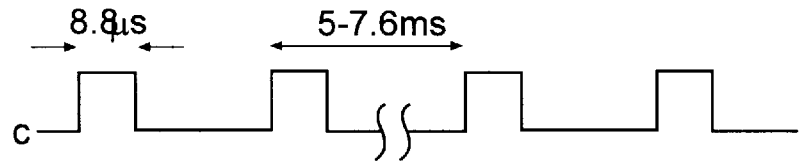
Figure 3B:
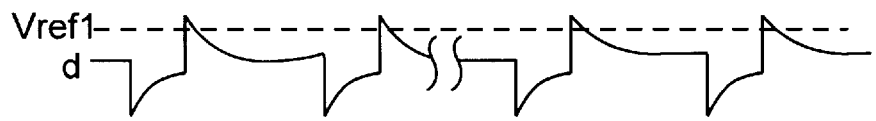
Figure 3C:
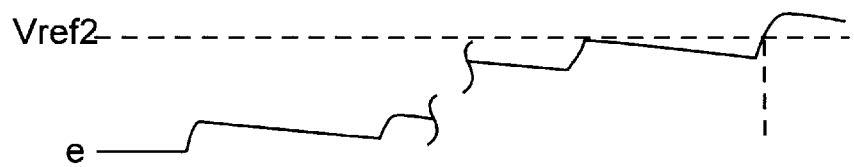
Figure 3D:
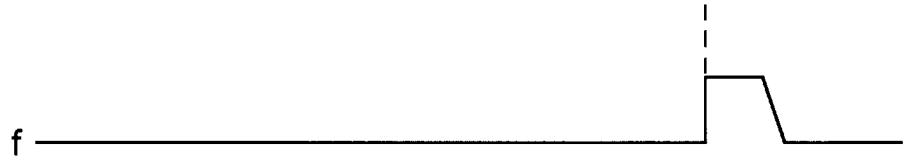
Figure 3E:
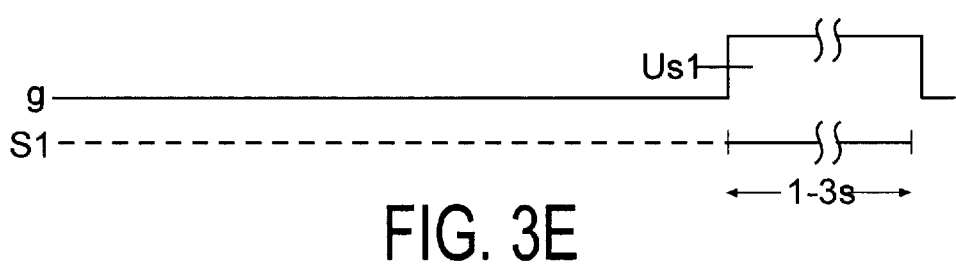
Figure 3F:

The small letters indicate the points in FIGS. 1 and 2 on which the signals in accordance with FIG. 3 are present.

DETAILED DESCRIPTION OF THE INVENTION

In FIG. 1, the mains UN is applied via the mains switch SN to the mains rectifier NG which produces the operating voltage UB as well as all the other operating voltages for the normal mode of the television receiver. The mains switch SN is closed in the normal mode and opened in the economy mode. Moreover, the mains UN is applied to the detector circuit 1. The latter only determines whether the mains voltage UN is or is not present and, in dependence thereon, delivers a control signal to the pulse stage 2. Apart from these, there are shown, the battery 3, the infra-red remote control receiver 5 controlled by the remote control unit 4, the filter 6, the micro processor 7 and the television receiver 8 controlled thereby. The switch S1 is located between the operating voltage UB which is delivered by the mains unit NG and the operating voltage terminal of the micro processor 7. The operating voltage terminals of the remote control receiver 5 and of the filter 6 are connectible by the switch S2 to the operating voltage UB obtained from the mains in the position a, and to the battery 3 in the position b. A charging path to the battery 3 is connected over the circuit 9 and the decoupling diode 10. The method of operation of this circuit for the individual operating modes will be explained, in succession, hereinafter.

1. Economy mode

The switch S1 is open, the switch S2 in the position b. The mains is completely switched off from the circuit of the apparatus whereby only the detector circuit 1 and the pulse stage 2 are effective. The receiver 5 is thus ready for the reception of a signal from the remote control unit 4 but no power is being taken from the mains.

2. Standby mode from the mains

The switch S2 is switched over to the position a so that the receiver 5 and the filter 6 are now fed from the mains at low power. This mode is initiated by the detector circuit 1 and the pulse stage 2 by means of the switching voltage Us3 when, for example, there is no mains voltage UN present or when an excessive discharge of the battery 3 is detected in the pulse stage 2 or else when the battery is completely discharged or not available. Otherwise, the readiness of the circuit for the reception of remote control signals is exactly the same as that in the economy made. Thereby, the switch S1 remains open and thus the processor 7 continues to be switched off.

3. Normal mode

If the filter 6 recognises a code allocated to the apparatus in the output signal from the receiver 5 e.g. by an evaluation of the edge slope, the pulse duration and the pulse spacing, then the filter 6 generates the switching voltage Us1. Thereupon, Us1 closes the switch S1. Thereby, and after the mains switch SN was also closed, the processor 7 is supplied with the operating voltage UB and it can then evaluate the signal arriving from the receiver 5 as to whether the signal contains a realisable command for the receiver e.g. "switch receiver to channel 11". If the processor 7 recognises a realisable command in the signal arriving from the receiver 5, it generates the switching voltage Us2 which then continues to keep closed the switch S1 that was temporarily closed by Us1. Moreover, the processor 7 controls the whole receiver circuit, such as for tuning-in channels, in accordance with the command received from the receiver 5.

Thereby, the switch S2 can adopt the position a or b since an operating voltage is present on both terminals a, b. Even in the position b, the battery 3 is now constantly, or as necessary, charged over the charging path 9, 10 by the voltage UTVon occurring in the normal mode. This charging current is greater than the discharge current for the feeding of the receiver 5 and the filter 6 so that the battery 3 cannot become discharged.

4. Failure of the mains

In the event of failure of the mains e.g. when transporting the apparatus, the pulse stage 2 generates a switching voltage Us3 which changes the position of the switch S2 into the position a. The battery 3 is then completely cut-off from the receiver circuit apart from the detector circuit 2. This is reasonable since, with no mains, the normal mode is no longer possible and consequently a feeding of the receiver 5 and the filter 6 from the battery 3 does not make sense.

FIG. 2 shows a practical circuit for the filter 6. Ui represents the signal source i.e. the output of the receiver 5. The signal voltage c reaches an input of the comparator 11 to whose output the differentiating member C1, R1 having a time constant of approximately 4 $\mu$s is connected. Thereby, there arises at the point d, the differentiated voltage d which reaches an input of the comparator 12 supplied with a reference voltage Vref1. Consequently, the comparator 12 only responds when the positive, differentiated peaks of the voltage d exceed the threshold value Vref1. The edge slope of the received signal c and the width of the positive pulses c are thereby evaluated and a distinction from signals from other loads, whose voltages generally exhibit a lower slope or pulses that are too short, is effected. The duration of the pulses c is substantially shorter for other loads such as fluorescent tubes for example. The voltage d does not then reach the threshold value Vref1 so that the circuit does not respond, as desired, to pulses from such types of load. The signal from the output of the comparator 12 reaches the integrating stage R2, D2, C2. R3 wherein the diode D2 causes a small charging time constant R2×C2 of ca 2 $\mu$secs and a substantially greater discharging time constant R3×C3 of ca 30 msec. The integrated voltage e, which reaches the comparator 13 fed with the reference voltage Vref2, is present at the output e of the integrating member. Due to the effect of the integration, the pulse f only appears at the output of the comparator 13 when a plurality of pulses c having a defined minimum edge slope and define d pulse spacing are received. The monostable circuit 14 is triggered by the pulse then generated in the voltage f and thereupon generates the switching voltage Us1. In accordance with FIG. 1, Us1 actuates the switch S1 shown as a transistor for a period of approximately 1–3 secs. If, during this time, the processor 7 recognises a realisable command then, as already described, the switching voltage Us2, which now holds the switch S1 shut, is generated.

Figure 4:
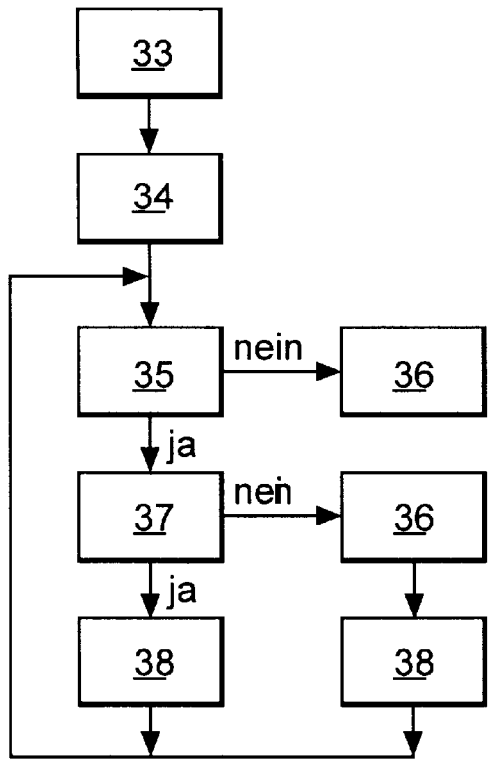

FIG. 4 depicts the timer operation in the economy mode. The clock 33 controls the date changer 34 which brings the date in the timer processor 35 up to date. There subsequently occurs a timer-place interrogation for this date. If there is no programming present, the video recorder goes into the normal economy mode 36. If a programming exists, it is checked as to whether it is a VPS programming 37. If there is no VPS programming present, the video recorder remains in the normal economy mode 36 and only goes into the limited economy mode 38 at the beginning of the recording in order to process the timer-place. In the event of a VPS programming being present, the limited economy mode 38 is immediately activated in order to then process the timer-place upon the reception of the appertaining VPS signal. After the current recording, a new interrogation of the timer place is undertaken and indeed, this is repeated until such time as no further programmings for this day are present. When this is the case, the video recorder reverts into the normal economy mode.

Figure 5:
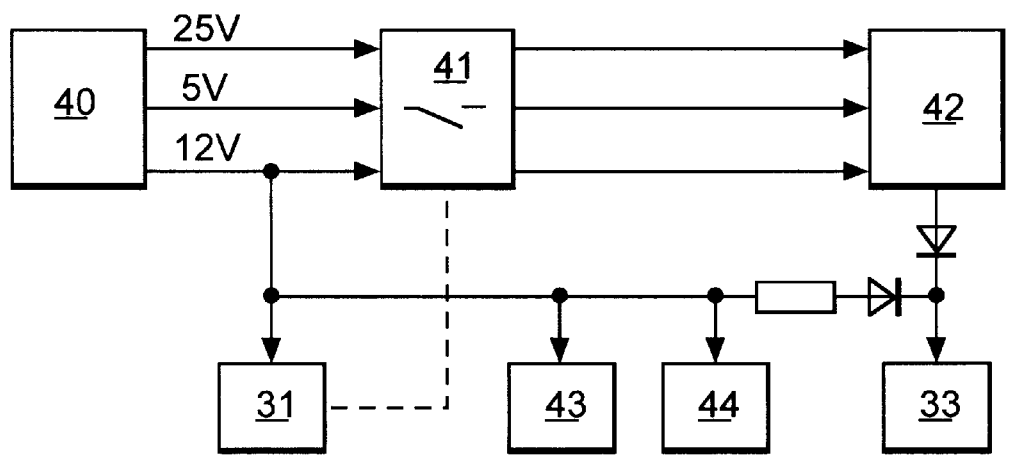

FIG. 5 shows the functional blocks of a VCR having an integrated economy logic. The switched power unit 40 has a connection to the standby switch 41 and the economy logic 31 which activates or de-activates the standby switch. Moreover, the power splitter 43 and the clock 33 are permanently supplied with voltage. In the normal economy mode, the functional blocks 42 which are not needed, the cassette feeder, IR receiver, keyboard, display and the signal processor are switched off by the economy logic or the economy button 31. In the timer mode, the VCR can be switched over into the limited economy mode by the economy logic in combination with the clock and the timer processor.

In the standby mode, all of the functional blocks, which are switched off in the normal economy mode (apart from the signal processing), are activated. The economy logic incorporates the economy button and a programme which controls the time sequence for the operating modes described above. The four operating modes (normal mode, standby mode, normal economy mode and limited economy mode) are realised in this manner.

What is claimed is:

1. A current supply circuit for an electronic apparatus having a standby mode of operation, a normal mode of operation and an economy mode of operation, said current supply circuit including a remote control receiver responsive to a remote control signal from a remote control unit to select one of said modes of operation, said current supply circuit comprising:

a filter responsive to said remote control receiver;

a main voltage source providing a main voltage;

means for detecting the presence of said main voltage and producing a switching voltage when said main voltage is present;

a first voltage responsive switch having a switching element connected to a first input contact in the presence of said switching voltage and to a second input contact in the absence of said switching voltage;

said first voltage responsive switch having an output contact connected to an input terminal of said remote control receiver and to a first input terminal of said filter, said output contact being selectively connected to said first and second input contacts in response to the respective presence and absence of said switching voltage;

said filter having a second input terminal connected to an output terminal of said remote control receiver first means for applying a first operating voltage to said first input contact in the presence of said switching voltage; and second means for applying a second operating voltage to said second input contact to place said current supply circuit into said economy mode of operation in the absence of said switching voltage;

said filter including means for evaluating the edge slope of a code, means for evaluating the pulse spacing of said code and means for evaluating the duration of the pulses of said code; and, wherein said filter includes a series arrangement of a differentiating stage, a first threshold evaluation stage, an integrating stage, a second threshold evaluation stage and a monostable trigger stage providing an output voltage.

2. An electronic apparatus having a standby mode of operation, a normal mode of operation and an economy mode of operation; said electronic apparatus comprising:

a remote control receiver responsive to a remote control signal from a remote control unit usable to select said modes of operation;

a microprocessor responsive to said remote control receiver;

a filter responsive to said remote control receiver for generating an output signal if a remote control signal is detected by the remote control receiver, said filter having means for evaluating the edge slope, the pulse spacing and the duration of pulses received by the remote control receiver, and having a series arrangement of a differentiating stage, a first threshold evaluation stage, an integrating stage, a second threshold evaluation stage and a monostable trigger stage providing an output voltage for activating said microprocessor;

a current supply circuit;

in said economy mode only the filter and the remote control receiver being in operation;

said current supply circuit having:

a main power supply responsive to a source of main power for producing an operating voltage;

a first switch responsive to said filter and said microprocessor for connecting said operating voltage to said microprocessor, said first switch being open in economy mode and closed in response to a brief close signal of said filter in response to a remote control signal for switching said electronic apparatus from said economy mode to said standby mode and thereafter the switch is kept closed by a long-term close signal from said microprocessor for staying in normal mode when said microprocessor recognizes said remote control signal;

a detector circuit connected to said source of main power and a pulse stage, the detector circuit delivering a control signal to said pulse stage indicative of the presence or absence of said source of main power;

a rechargeable battery which is recharged by a voltage occurring in normal mode and which powers said remote control receiver and said filter in said economy mode; and a second switch responsive to said pulse stage and having an output contact connected to an input terminal of said remote control receiver and to an input terminal of said filter and having a first input contact connected to said operating voltage and a second input connected to said battery, said pulse stage generating a switching signal for said second switch in case of main power failure which cuts off said battery from said filter and said remote control receiver.

3. A current supply apparatus comprising:

means for receiving a user initiated signal;

first means, coupled to said receiving means, for detecting and for generating a first output signal in response to said user initiated signal, said first detecting means having means for evaluating the edge slope, the pulse spacing and the duration of pulses received by said receiving means, and having a series arrangement of a differentiating stage, a first threshold evaluation stage, an integrating stage, a second threshold evaluation stage and a monostable trigger stage providing an output voltage:

a microprocessor coupled to said receiving means, said microprocessor generates a second output signal in response to a proper user initiated signal;

a main power supply responsive to a source of main power for producing an operating voltage;

a rechargeable battery which only powers said receiving means and said first detecting means in an economy mode;

a first switch having an open state wherein said apparatus operates in said economy mode and a closed state wherein said operating voltage is provided to said microprocessor, said first switch initially operating in said closed state in response to said first output signal and thereafter in response to said second output signal;

second means, coupled to said source of main power and said battery, for detecting and for generating a third control signal in response to one of absence of said source of main power and absence of sufficient power for said economy mode; and a second switch for disconnecting said battery from said receiving means and said first detecting means in response to said third control signal.

* * * * *